(12) United States Patent
Hudd et al.

(10) Patent No.: US 6,364,344 B2
(45) Date of Patent: Apr. 2, 2002

(54) STEERING WHEEL WITH A DRIVER AIRBAG MODULE

(75) Inventors: Ray Hudd; Ray Trebes; Tim Scott, all of Essex (GB)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/755,930

(22) Filed: Jan. 5, 2001

(51) Int. Cl.[7] ............................................... B60R 21/16
(52) U.S. Cl. ................. 280/728.2; 280/731; 200/61.55; 411/508
(58) Field of Search ............................. 280/728.2, 731; 411/508; 24/453; 200/61.54, 61.55, 61.56, 61.57

(56) References Cited

U.S. PATENT DOCUMENTS

| 5,350,190 A | * | 9/1994 | Szigethy |
| 5,624,130 A | * | 4/1997 | Ricks |
| 6,029,992 A | * | 2/2000 | Vendely et al. |

* cited by examiner

Primary Examiner—Paul N. Dickson
(74) Attorney, Agent, or Firm—Gary A. Smith

(57) ABSTRACT

A steering wheel airbag assembly (1) for a motor vehicle with a driver airbag module (2), in which the module snaps into an aligned engagement with the steering wheel during manufacture of the steering wheel. The assembly (1) includes an airbag supporting portion (4) with a plurality of apertures therein (21,31,41) and a driver airbag module (2) attached to the supporting portion (4) and having a plurality of legs (14,15,16), each of which extends slidingly into a corresponding aperture (21,31,41) being movable towards and away from the supporting portion (4). Engagement barbs (24) between each leg (14,15,16) and aperture (21,31, 41) limits said movement and keeps the module (2) and supporting portion (4) attached. A spring (19) between the module (2) and the supporting portion (4) spring biases the module away from the supporting portion (4). A leg (14,15, 16) has a first pair of outwardly opposed surfaces (28,29) that form a loose sliding fit with the aperture (21,31,41), and a second pair of outwardly opposed surfaces (26,27) that form a tight sliding fit with corresponding surfaces (32) of said aperture in order to locate the module (2) transversely on the supporting portion (4) as the module (2) is moved relatively towards and away from the supporting portion (4).

16 Claims, 1 Drawing Sheet

STEERING WHEEL WITH A DRIVER AIRBAG MODULE

FIELD OF THE INVENTION

The present invention relates to a steering wheel for a motor vehicle with a driver airbag module, in which the module snaps into an aligned engagement with the steering wheel during manufacture of the steering wheel.

BACKGROUND OF THE INVENTION

Motor vehicle driver airbags are normally located in the center of the steering wheel, and often in an airbag module which may be pressed to activate the vehicle horn. Such modules float on a spring biasing means sufficiently soft to be activated by a user's finger. The modules also need to be retained to a supporting portion of the steering wheel, for example a metal frame in such a way that the high forces exerted during inflation of the air bag, owing to contact of the inflating air bag with the surrounding steering wheel, do not cause the module to be pulled off the steering wheel.

It is also generally desirable that such airbag modules are relatively inexpensive to manufacture and can be quickly and inexpensively affixed to the steering wheel during manufacture of the motor vehicle.

A number of arrangements have been proposed for such steering wheels. One prior art steering wheel with an airbag is disclosed in EP 0 754 603 A1, in which a pair of cylindrical legs fix the module to a steering wheel frame. The frame has apertures with clearance for the legs, and each leg has four tabs or barbs that are equally spaced around the circumference of the leg. The barbs are depressed against the surface of the leg during insertion of the legs through the apertures, and squeeze through the aperture to spring outwards beyond the edges of the aperture to keep the module retained to the steering wheel frame.

A problem has been noted with such prior art steering wheels. Although the airbag module may be quickly snap-fitted to the frame during manufacture of the motor vehicle, the need for clearance between the leg and the aperture to allow the legs and barbs to pass through the apertures, means that there is transverse slack in the attachment of the module to the steering wheel frame. This slack has a number of undesirable consequences. The airbag module will often be covered in a plastic material cover, surrounded by a similar plastic covering the rest of the steering wheel. In the case where the horn is activated by pressing the module, there is a need to prevent the module from interfering with the surround, and the transverse slack means that the gap between the module and the steering wheel surround may need to be as great as 2 mm, which may be unsightly. Another problem is that the module may rattle transversely owing to vibrations transmitted up though the steering column.

SUMMARY OF THE INVENTION

According to the invention, there is provided a steering wheel airbag assembly for a motor vehicle, comprising: an airbag supporting portion with a plurality of apertures therein; a driver airbag module attached to the supporting portion and having a plurality of legs, each of the legs extending into a corresponding aperture and being slidable therein so that the module has a degree of travel towards and away from the supporting portion; engagement means provided between each leg and aperture to limit said degree of travel and keep the module attached to the supporting portion; a spring biasing means between the module and the supporting portion by which the module is spring biased away from the supporting portion, wherein a leg has a first pair of outwardly opposed surfaces that form a loose sliding fit with the aperture, and a second pair of outwardly opposed surfaces that form a tight sliding fit with corresponding surfaces of said aperture in order to locate the module in one transverse direction on the supporting portion as the module is moved towards and away from the supporting portion.

The tight sliding fit allows the airbag module to move longitudinally in a direction defined by the legs, as may be needed, for example in order to make a connection to activate a horn or some other device in the motor vehicle.

In a preferred embodiment of the invention, the loose sliding fit of the leg defines a slack axis of the aperture, the slack axis being oriented generally towards a central portion of the steering wheel. The slack between the leg and aperture can therefore take up dimensional variation between the module and supporting portion, which will be more apparent across the extent of the module and support assembly than over small distances.

The engagement means may be one or more barbs towards the end of a leg which engage with one or more corresponding edges of an aperture.

In a preferred embodiment of the invention, a leg has four sides, for example with a square or a rectangular cross-section, the first and second outwardly opposed surfaces being provided by the four sides and the barb means being provided on at least one of the sides. For reasons of strength, barbs should preferably be on both of an opposite pair of sides.

Preferably, a pair of barbs is provided one on each of the second pair of outwardly opposed surfaces. Because this pair of surfaces makes a tight sliding fit with the aperture, there is no easy way for the barbs to slip back into the aperture and so disengage the module from the supporting portion. The module is therefore securely attached to the supporting portion.

The steering wheel may be designed so that the module can be assembled to the supporting portion in a press-fit operation in which the engagement means snaps into engagement to attach the module to the supporting portion. This avoids the need for an assembly worker to get behind the steering wheel, for example to secure the module with bolts. The arrangement may be such that the "snap" is clearly audible, so providing a positive confirmation that the module is indeed secured to the supporting portion.

To aid insertion of the legs into the apertures during assembly of the steering wheel, the end of one or more of the legs may be tapered to aid insertion of said leg into the apertures. The engagement means may then be such that this prevents further insertion of said leg until a sufficient pressure is bough to bear to complete the insertion and snap the engagement means into engagement. Because a steering wheel airbag module is normally flush with the surrounding steering wheel, this provides the benefit that if a worker does not complete the assembly by failing to press-fit the module to the supporting portion, then the module will stand proud of its surrounds, thereby providing an obvious visual cue that the airbag module is not corrected seated in the steering wheel.

Advantageously, the degree of travel permitted by the tight sliding fit of the legs in the apertures allows over-insertion of a leg into an aperture during assembly of the module to the supporting portion to ensure that the engagement means such as barbs are properly engaged.

The transverse location provided by close contact between the second pair of surfaces and the aperture will tend to increase the accuracy of the transverse location of the module with respect to the rest of the steering wheel, so allowing improvements to be made in the way the module fits in the steering wheel. For example, the improvement may allow a gap between the module and a surround to be reduced from 2 mm to about 1 mm or less.

Preferably, there are three or more of the legs, at least one of which has first and second pairs of outwardly opposed surfaces angled to corresponding pairs on the other legs so that the tight sliding fit of the second pairs of outwardly opposed surfaces of said three or more legs locates the module on the supporting portion in orthogonal transverse directions. For example, there may be three such legs, two of which have outwardly opposed surfaces similarly orientated with respect to each other, the third leg then being angled at 90° to the other two legs. The pair of similarly oriented legs therefore each locate the module in one transverse direction, whilst the third leg orients the module in an orthogonal transverse direction, and together all three legs prevent rotation of the module about a longitudinal axis passing between all three of the legs.

In general, the tight sliding fit may result in some stiction that tends to prevent the module moving away from the supporting portion. Therefore, the spring biasing means may advantageously provide a spring bias that is sufficiently strong to overcome this stiction.

One way of providing the spring biasing means is to provide a coil spring wrapped around one or more of the legs. Each leg therefore retains the coil spring in place.

The steering wheel will generally have a pair of electrical contacts for a horn. One of the contacts may be provided on the module with the other of the contacts being provided on the supporting portion. The contacts then are closed when the module is moved towards the supporting portion.

Optionally, the supporting portion may comprise a horn plate. The horn plate need not provide structural strength, but may be disposed between a structural frame of the supporting portion and the module. Then one of the contacts may be provided on the module with the other of the contacts being provided on the horn plate, again the contacts being closed when the module is moved relatively towards the supporting portion.

The horn plate may have a number of apertures through which the legs pass when the module is attached to the supporting portion. Because the module will be located with respect to apertures in the supporting portion frame, there is no need for the horn plate also to have apertures. However, if the horn plate has apertures, each of these may have clearance for the free movement of the legs relative to the horn plate when the module is moved towards and away from the supporting portion.

One way in which the tight sliding fit may be provided is if the dimensional tolerances of the legs, apertures and distances between the legs and apertures is closely controlled, In practice however, this may be difficult to achieve at a reasonable cost. Therefore, it is preferred if one or more of the legs are compressible at least in a direction normal to the second pair of outwardly opposed surfaces. The distance between the second pair of surfaces may then be greater than the separation between the corresponding aperture surfaces so that the tight sliding fit is provided by the inward compression of the second pair of surfaces by the corresponding aperture surfaces.

When engagement means such as barbs are on the second pair of surfaces, the combination of a tight sliding fit and a snap engagement of the legs in the apertures is helped by the fact that the legs may be compressible. It is therefore not necessary for the legs to have a recess to allow the barbs to be pressed flat against the surface of the legs when the barbs are inserted trough the supporting portion apertures as the module is assembled to the supporting portion.

One way in which the legs may be made compressible, is if a leg has walls formed of a resiliently flexible material around a hollow center. Another way is if the legs are formed from plastic coated thin sheet steel, which may have a U-shaped cross-section around a hollow center. Steel in particular has a high tensile strength, which is useful in keeping the module secured to the supporting portion, even when stressed owing to the high forces present tending to pull the airbag module away from the supporting portion when the airbag is inflated.

One way in which a smooth tight sliding fit may be achieved is if the second pair of outwardly opposed surfaces are of a plastic material and the corresponding surfaces of the aperture are metal. The plastic material may, for example, be a nylon plastic. It has been found that the fit between the plastic material will tend to improve the first few times the module is moved longitudinally, owing to a burnishing effect of the plastic by the harder metal. The movement therefore becomes smoother with use, for example after the first few times a horn has been activated. The burnishing effect naturally leads to a close, tight fit, and this together with the use of a slippery plastic material tends to eliminate transverse slack whilst at the same time allowing for squeak and rattle free operation.

BRIEF DESCRIPTION OF THE DRAWINGS

The invention will now be described by way of example, with reference to the accompanying drawing, in which.

DETAILED DESCRIPTION OF THE PREFERRED EMBODIMENT

Figure 1:
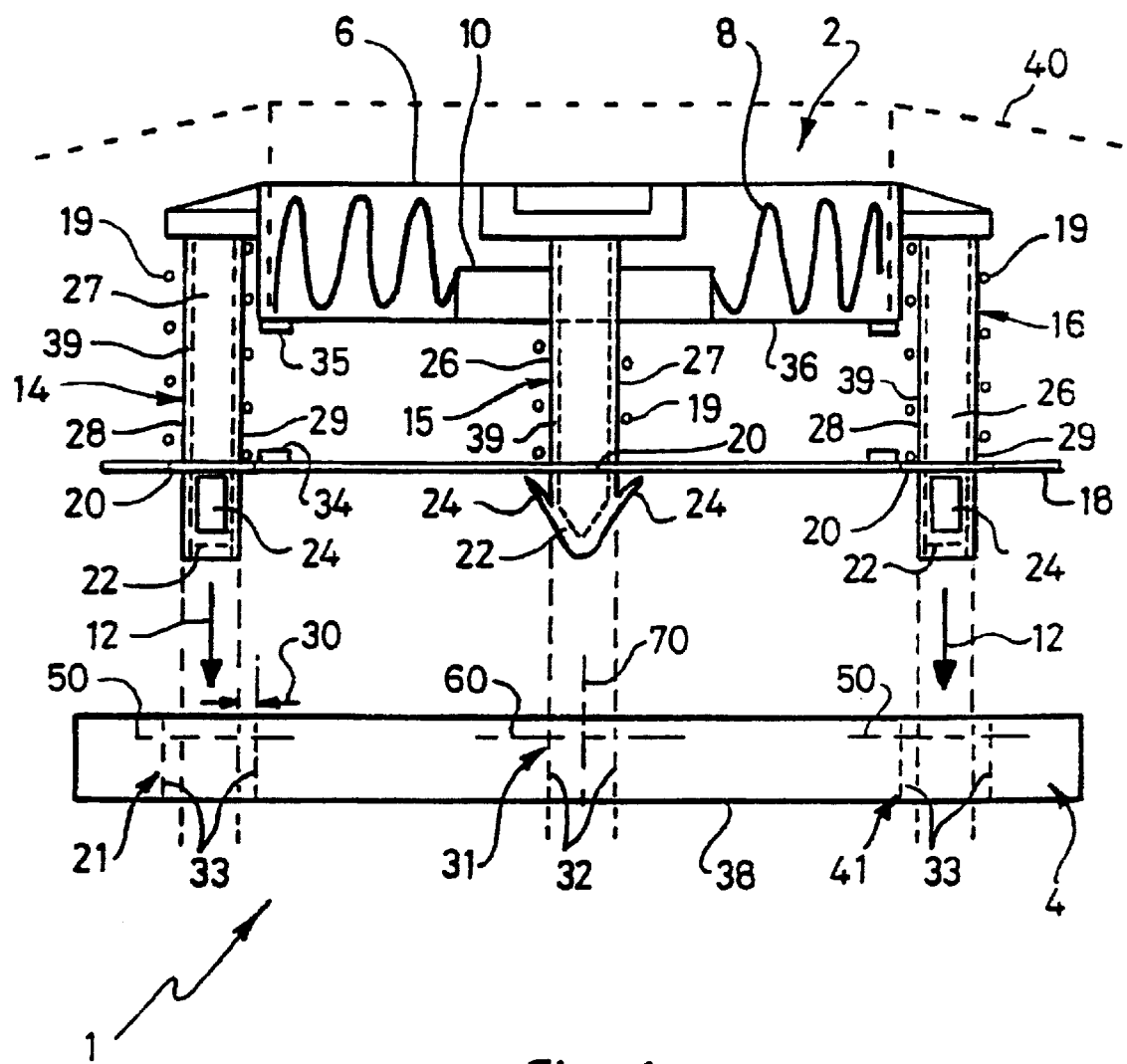
FIG. 1 is a schematic side view of a steering wheel airbag assembly according to the invention.

FIG. 1 shows schematically part of a motor vehicle steering wheel air bag assembly 1, comprising an airbag module 2, and a generally flat or planar supporting portion 4. The planar supporting portion 4 will generally be centrally located on and parallel with the plane of a steering wheel and connected directly to the end of a steering column (not shown).

The airbag module 2 has an airbag container 6, with a folded airbag 8 and a gas generator 10 therein. The airbag module 2 is attached to the supporting portion 4 during manufacture of the motor vehicle in a press-fit operation, represented by arrows 12, in which three parallel legs 14,15,16 that extend away from the airbag container 6 are inserted first into three identical clearance holes 20 in a horn plate 18 and then three matching holes 21,31,41 in the supporting portion 4.

The legs 14,15,16 are spaced triangularly around the center of the airbag module 2, the legs being integrally molded with the airbag container 6, in a tough and resilient plastic material, such as nylon.

Each of the legs 14,15,16 has a square cross-section 10.5 mm on each side, apart from a tapered tip 22, which aids insertion of the legs through the holes 20 in the horn plate 18 and the supporting portion 4, and a pair of barbs 24 on opposite sides 26,27 of each leg 14,15,16. Each leg is hollow having external walls 39 that are 1.5 mm thick. The leg walls 39 are therefore inwardly compressible.

Together, the legs are capable of withstanding a force of 5 kN directed axially away from the steering wheel, that may be generated during inflation of the airbag 8.

The legs 14,15,16 are spaced triangularly around the center of the airbag module 2, with two of the legs 14,16 being similarly aligned so that each of the pairs of barbed sides 26,27 is coplanar with the corresponding barbed sides 26,27 on the other leg. If a line between the two similar legs 14,16 forms the base of a triangle, the third leg 15 is at the apex of the triangle. The third leg 15 has barbed sides 26,27 oriented at 90° to the other two legs 14,16.

When the legs are inserted into the three horn plate clearance holes 20, each barb 24 is pressed inwards against the side 26,27 of the leg 14,15,16. The sides 28,29 of the legs between the barbed sides 26,27 also pass easily with clearance through the horn plate holes 20.

The apertures 21,31,41 in the supporting portion 4 have similar rectangular profiles, being 15 mm long and 10 mm wide. The length of the apertures 21,31,41 is therefore 3.5 mm greater than the cross-sectional width of the legs 14,15,16 and so defines a slack axis 50 between slack aperture sides 33 in the plane of the supporting portion 4. Similarly the width of the apertures is 0.5 mm less than the width of the legs, and therefore defines a tight axis 60 between tight aperture sides 32 at right angles to the slack axis 50 and in the plane of the supporting portion 4.

The apertures 21,41 for the similarly oriented legs 14,16 are themselves similarly oriented, with the slack axis 50 of the apertures 21,41 lying in the plane of the drawing. The other aperture 31 is oriented with its slack axis 50 at 90° to that of other apertures, i.e. normal to the plane of the drawing. The arrangement of the apertures is such that the slack axes 50 are oriented generally towards a central axis 70 through the middle of and normal to the planar supporting portion 4.

When the legs 14,15,16 are press-fitted into the corresponding apertures 21,31,41, the barbs 24, contact the tight aperture sides 32. As the module 2 is pressed further towards the supporting portion 4, the barbs 24 are pressed inwards by the tight aperture sides 32 until the pressure causes the leg sides 26,27 to compress inwardly, whereupon the barbs pass the apertures 21,31,41 and snap resiliently outwardly into engagement with a lower surface 38 on the steering wheel supporting portion 4.

The leg sides 28,29 between the barbs 24 are formed with a separation less than that of the slack sides 33 of the apertures, and so the leg sides 28,29 pass easily into the apertures along the slack sides 33, even though the compression of the legs on the other two sides 26,27 will cause the leg sides 28,29 to bulge out somewhat. Thus, the aperture slack sides 33 provide clearance 30 for the leg sides 28,29, and aperture tight sides 32 provide a tight sliding fit for the barbed sides 28,29 of each leg 14,15,16. The leg sides 28,29 therefore are a first pair of outwardly opposed surfaces that form a loose sliding fit with the aperture, and the leg sides 26,27 are a second pair of outwardly opposed surfaces that form a tight sliding fit with corresponding aperture surfaces 32. The sliding contact between the aperture surfaces 32 and leg sides 26,27 for similarly oriented legs 21,41 locates the module 2 in one transverse direction on the supporting portion 4 as the module is moved relatively towards and away from the supporting portion, and similarly the same sliding contact between the third leg 15 and aperture 31 locates the module in an orthogonal transverse direction.

The tolerances on the cross-sectional dimensions of each individual leg or aperture can be well-controlled during manufacture, typically to less than ±0.1 mm, and will remain essentially unaffected by temperature changes or ageing of plastic materials. Dimensional tolerances across the full extent of the supporting portion 4 or module 2 are much harder to control in manufacture, and can vary owing to thermal expansion which can result in up to 1 mm movement over a maximum design limit of about 100° C. Because the slack axes 50 are oriented generally towards the middle axis 70 of the assembly 1, the slack axes can accommodate dimensional variability owing to manufacturing accuracy and thermal expansion.

Once the assembled, the airbag module 2 is covered over with a plastic cover 40 in a known manner.

The length of the legs 14,15,16 is sufficient to allow for some travel of the airbag module 2 along the length of the legs after the module has been attached to the supporting portion 4, so that two electrical contacts, one 34 on the horn plate 18, and the other 35 on an underside 36 of the airbag container 6, may be brought together to activate a vehicle horn (not shown). Each leg 14,15,16 is surrounded by a coil spring 19, which bears upon the horn plate 18 and the underside 36 of the airbag container 6. Together, the coil springs 19 provide a force of about 12 N, sufficient to move the airbag module 2 away from the horn plate to break the connection between the contacts 34,35 once the user stops activating the horn.

The movement permitted by the horn mechanism is also sufficient for each of the legs 14,15,16 to be inserted into the supporting portion matching apertures 21,31,41 far enough to ensure that each barb 24 snaps past the edge of the matching aperture 21,31,41 into engagement with the lower surface 38 on the steering wheel supporting portion 4.

The close contact between the sides 26,27 of the legs 14,15,16 and the tight surfaces 32 of the supporting portion apertures 21,31,41 serves to take up slack and align the airbag module 2 simultaneously in orthogonal transverse directions. The pair of similarly aligned legs 14,16 aligns the module 2 with respect to the supporting portion 4 in a plane normal to that of FIG. 1, and the third leg 15 then aligns the module 2 in a direction in the plane of FIG. 1. Together, the three legs 14,15,16 also prevent rotation about an axis parallel to the direction of the three legs.

The tight sliding contact between the leg surfaces 26,27 and the inner surfaces 32 of the supporting portion hole 21 results in a static friction, or stiction. The hole inner surfaces 33 are of metal, for example a cast aluminum alloy, and can be formed with a roughness sufficient to burnish the plastic leg surfaces 26,27, but without causing the plastic surface to be abraded and so over time loosen the fit between the legs 14,15,16 and supporting portion apertures 21,31,41. By the appropriate choice of materials and dimensions, the stiction can be controlled to decrease initially to a value of about 3 N. The burnishing of a slippery plastic surface such as nylon also allows squeak-free operation of the horn.

The assembly described above is particularly suitable for use with a steering wheel having three spokes, as each of the three apertures can then be provided on a part of the supporting portion extending along a spoke. If a steering wheel has four spokes, then four legs and apertures may be employed, and in this case, the slack axis of each aperture would most probably be oriented in a direction along each spoke to a central axis of the steering wheel.

The invention allows a rapid and economical assembly of a motor vehicle steering wheel having an air bag, whilst at the same time achieving close transverse tolerances without excess slack. This permits gaps in moldings covering the airbag module and surround to be reduced, and also helps to prevent any rattles owing to vibrations transmitted up the steering column. The use of a snap fit attachment between the airbag module and the steering wheel supporting portion is convenient, and avoids the need to gain access behind the steering wheel, for example to fit fixing bolts or nuts.

What is claimed is:

1. A steering wheel airbag assembly for a motor vehicle, comprising: an airbag supporting portion with a plurality of apertures therein; a driver airbag module attached to the supporting portion and having a plurality of legs, each of the legs extending into a corresponding aperture and being slidable therein so that the module has a degree of travel towards and away from the supporting portion; engagement means provided between each leg and aperture to limit said degree of travel and keep the module attached to the supporting portion; a spring biasing means between the module and the supporting portion by which the module is spring biased away from the supporting portion, wherein at least one of the legs has a first pair of outwardly opposed surfaces that form a loose sliding fit with the aperture, and a second pair of outwardly opposed surfaces that form a tight sliding fit with corresponding surfaces of said aperture in order to locate the module in one transverse direction on the supporting portion as the module is moved towards and away from the supporting portion.

2. An assembly as claimed in claim 1, in which the loose sliding fit of the leg defines a slack axis of the aperture, the slack axis being oriented generally towards a central portion of the steering wheel.

3. An assembly as claimed in claim 1, in which the engagement means is one or more barbs towards the end of the leg which engage with one or more corresponding edges of the aperture.

4. An assembly as claimed in claim 3, in which a pair of barbs are provided one on each of the second pair of outwardly opposed surfaces.

5. An assembly as claimed in claim 1, in which the module is assembled to the supporting portion in a press-fit operation in which the engagement means snaps into engagement to attach the module to the supporting portion.

6. An assembly as claimed in claim 5, in which the end of the leg is tapered to aid insertion of said leg into the aperture during assembly of the steering wheel, the engagement means preventing further insertion of said leg until a sufficient pressure is reached to complete the insertion and snap the engagement means into engagement.

7. An assembly as claimed in claim 5, in which said degree of travel allows over-insertion of the leg into the aperture to ensure engagement of the engagement means.

8. An assembly as claimed in claim 1, in which there are three or more of said legs, at least one of which has first and second pairs of outwardly opposed surfaces angled to corresponding pairs on the other legs so that the tight sliding fit of the second pairs of outwardly opposed surfaces of said three or more legs locates the module on the supporting portion in orthogonal transverse directions.

9. An assembly as claimed in claim 1, in which the tight sliding fit results in stiction that tends to prevent the module moving away from the supporting portion, the spring biasing means providing a spring bias that is sufficiently strong to overcome the stiction.

10. An assembly as claimed in claim 1, in which the spring biasing means is a coil spring wrapped around one or more of the legs.

11. An assembly as claimed in claim 1, comprising a pair of electrical contacts for a horn, one of the contacts being provided on the module and the other of the contacts being provided on the supporting portion, the contacts being closed when the module is moved towards the supporting portion.

12. An assembly as claimed in claim 11, in which the supporting portion comprises a frame and a horn plate, the horn plate being disposed between the frame and the module and the apertures being provided at least in the frame, one of said contacts being provided on the horn plate.

13. An assembly as claimed in claim 12, in which the horn plate has a number of apertures through which the legs pass when the module is attached to the supporting portion, each of said horn plate apertures having clearance for the free movement of the legs relative to the horn plate when the module is moved towards and away from the supporting portion.

14. An assembly as claimed in claim 1, in which the leg is compressible at least in a direction normal to the second pair of outwardly opposed surfaces, the distance between said second pair of surfaces being greater than the separation between the corresponding aperture surfaces so that the tight sliding fit is provided by the inward compression of said second pair of surfaces by the corresponding aperture surfaces.

15. An assembly as claimed in claim 14, in which said compressible leg has walls formed of a resiliently flexible material around a hollow center.

16. An assembly as claimed in claim 1, in which the second pair of outwardly opposed surfaces are of a plastic material and the corresponding surfaces of the aperture are metal.

* * * * *